May 3, 1955  E. V. BUNTING  2,707,612
OVERLOAD RELEASE VALVE
Filed Nov. 13, 1951  2 Sheets-Sheet 1

INVENTOR.
ERNEST V. BUNTING
BY
ATTORNEYS

May 3, 1955  E. V. BUNTING  2,707,612
OVERLOAD RELEASE VALVE
Filed Nov. 13, 1951  2 Sheets-Sheet 2

INVENTOR.
ERNEST V. BUNTING
BY
Carlson, Pitzner, Hubbard & Wolfe
ATTORNEYS

United States Patent Office 2,707,612
Patented May 3, 1955

2,707,612

OVERLOAD RELEASE VALVE

Ernest V. Bunting, Detroit, Mich., assignor to Harry Ferguson, Inc., Detroit, Mich., a corporation of Delaware Application November 13, 1951, Serial No. 256,112

9 Claims. (Cl. 251—62)

The invention relates to an improved overload release valve for pressure fluid operated systems and particularly for systems of the type employed in tractors for raising and lowering the hitch linkage to adjust implement depth and weight transfer.

Systems of the above general character are frequently subjected to sudden overloads, as when the implement strikes an obstruction such as a buried root or rock. When that occurs quick release of fluid from the system is necessary to relieve the tractor driving wheels of the weight of the implement and thus reduce the tractive effort sufficiently to avoid damage to the implement or the hitch linkage.

In my earlier application Serial No. 99,546, filed June 16, 1949, now Patent No. 2,677,322 granted May 4, 1954, I have disclosed the broad idea of effecting such quick release by means of a release valve which, upon slight initial opening due to an overload condition, automatically opens fully to vent the system instantaneously. The present invention has for its general object the improvement of such valves and particularly the simplification of construction to adapt them for commercial production.

Another object is to provide an efficient and reliable release valve utilizing a relatively small number of parts, all of which can be manufactured at low cost and which can be assembled very quickly and easily.

Still another object is to provide a valve construction in which wear on the parts is minimized and in which the parts that are subject to wear can be replaced easily and at minimum expense.

Other objects and advantages of the invention will become apparent from the following detailed description of the preferred embodiment illustrated in the accompanying drawings, in which.

Figure 1:
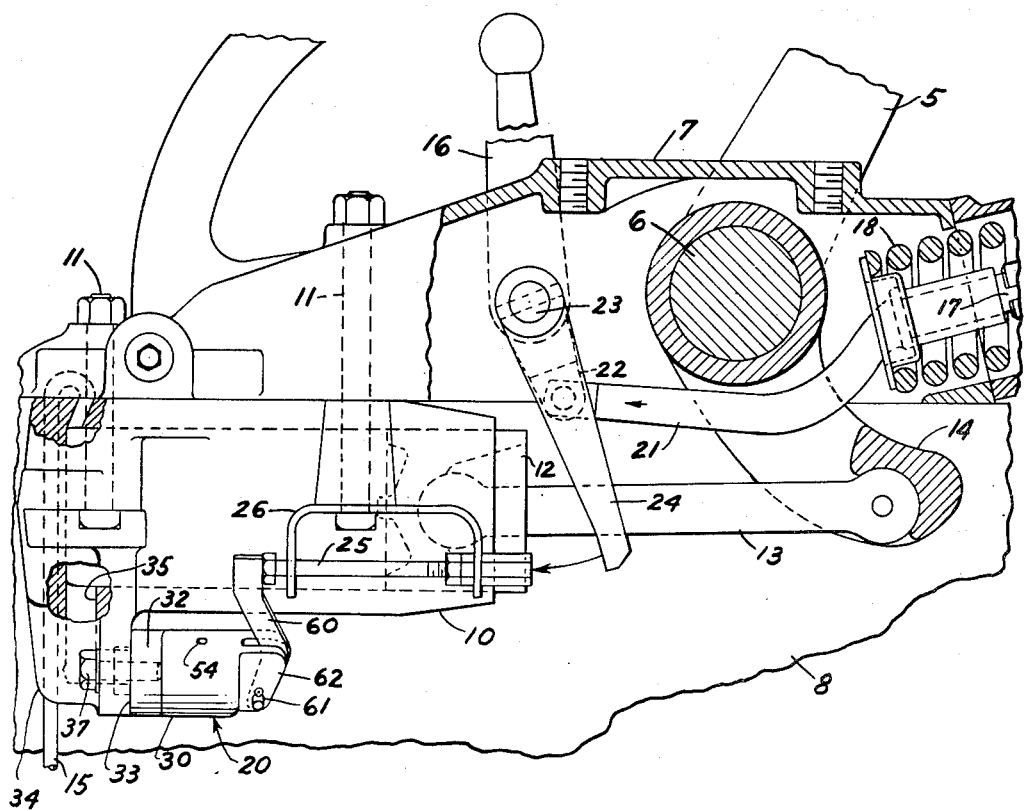
Figure 1 is a fragmentary sectional view through the center housing of a tractor equipped with a pressure fluid operated hitch linkage actuating system and showing the improved release valve in association with the actuator of the system.

For purposes of illustration a preferred embodiment of the invention has been shown and will be described in detail. It is not intended that the detailed character of the disclosure should limit the invention to such particulars, but on the contrary it is intended to cover all modifications and alternative constructions falling within the spirit and scope of the invention as expressed in the appended claims.

For purposes of illustration the improved valve has been shown in a pressure fluid operated system for tractors of the general type disclosed in the Ferguson Patent No. 2,118,180 issued May 24, 1938, and embodying certain improvements disclosed and claimed in my copending application Serial 254,305, filed November 1, 1951. As is well known, systems of that character are arranged to raise and lower the hitch linkage of the tractor through the medium of crank arms 5 (Fig. 1) suitably connected to the linkage and fixed at opposite ends to a rockshaft 6 journaled on a cover plate 7 serving as a closure for the upper end of the tractor center housing 8.

The shaft 6 is rocked to raise or lower the hitch links by a pressure fluid actuated power system enclosed in the center housing 8. The system includes an actuator, herein shown as a one way ram, comprising a cylinder 10 mounted on the underside of the cover plate 7 as by bolts 11. The cylinder 10 opens to the rear of the tractor and is fitted with a piston 12 formed with a socket for receiving one end of a piston rod 13, which has its other end socketed in the lower end of an arm 14 rigid with the rockshaft 6.

With the above arrangement introduction of pressure fluid into the forward end of the cylinder 10 forces the piston 12 rearwardly and rocks the shaft 6 counterclockwise, as viewed in Fig. 1. Such rocking of the shaft serves to raise the hitch links. In systems of the type illustrated, pressure fluid is supplied to the cylinder 10 through a conduit 15 from a pump (not shown) driven from the tractor engine. Exhaust of fluid from the ram cylinder 10 permits the piston 12 to retreat into the cylinder under the urge of the gravity load on the hitch links.

Valve means of suitable and well known construction is provided for controlling the supply and exhaust of fluid through the conduit 15, such valve means being actuated jointly by a hand lever 16, commonly called a quadrant lever, and a plunger 17 displaced in one direction or other from a neutral position against the force exerted by a main control spring 18 in response to changes in the draft load on the hitch linkage.

The mechanism by which the valve actuation is effected is of no concern to the present invention except that a part thereof is utilized to initiate operation of a release valve 20 when a predetermined overload is imposed on the hitch linkage. To this end the plunger 17 is connected by a link 21 with a crank arm 22 fast on a transverse shaft 23 journaled on the housing cover plate 7. Another arm 24 fixed on the shaft 23 is positioned to coact with a push rod 25 supported by a bracket 26 for endwise sliding movement parallel to the axis of the ram cylinder 10. The arrangement is such that upon displacement of the plunger 17 beyond its normal operating range due to the imposition of an overload on the hitch linkage, the arm 24 engages the projecting end of the push rod 25 and shifts it forwardly to initiate operation of the release valve 20, as will appear presently.

In order to insure prompt interruption of the application of draft force to the implement, the valve 20 is constructed and arranged to effect substantially complete and instantaneous venting of the ram cylinder 10 when the draft load exceeds the predetermined value for which the system is set. More particularly, the valve is constructed and arranged so that the initial small opening or "cracking" of the valve is effective to bring about an immediate and automatic full opening. Such full opening of the valve permits rapid exhaust of fluid from the ram cylinder 10 with a prompt lowering of the hitch linkage to shift the implement weight from the rear tractive wheels of the tractor.

The valve 20 as constructed in accordance with the invention, is characterized by its simplicity, that is, it is made up of relatively few parts and those are designed for low cost production and easy assembly. Moreover, only simple and inexpensive sealing rings are required to effectively prevent leakage through the valve when closed and fluid is directed through the valve when opened so that wear on the parts is minimized.

Figure 3:
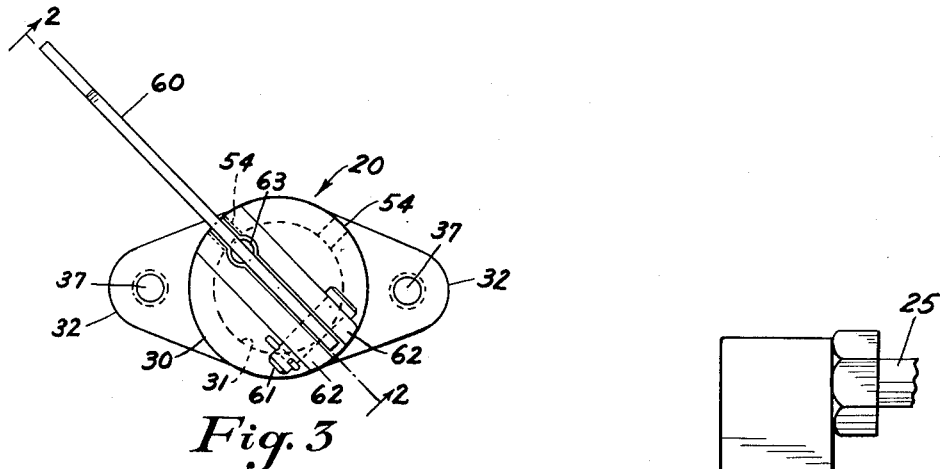
Fig. 3 is an end view of the valve.
Figure 2:
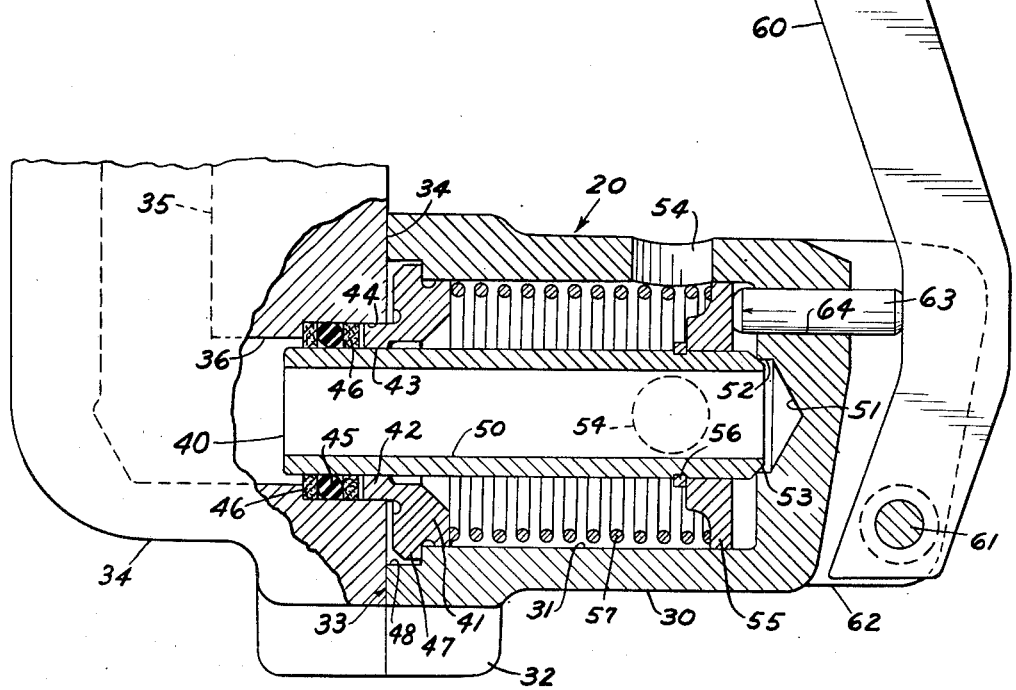
Fig. 2 is a sectional view of the improved valve taken in a plane through the longitudinal axis of the valve substantially on the line 2—2 of Fig. 3.

Referring now to Fig. 2 of the drawings, the release valve 20 in its preferred form comprises a housing 30 defining a cylindrical chamber 31 open at one end, in this instance at its forward end. Adjacent its open end the housing 30 is formed with two oppositely projecting ears 32 (Fig. 3) for attachment to a supporting structure. In the exemplary embodiment the end of the housing 30 and the outer faces of the ears 32 are machined to present a flat bearing surface 33 adapted to fit flush against a similar flat surface formed on the rear face of an extension 34 adjacent the front end of the ram cylinder 10, as shown in Figs. 1 and 2.

Communication between the front or pressure end of the ram cylinder 10 and the chamber 31 is afforded by a passage 35 formed in the extension 34 and opening at the rear face thereof through a cylindrical bore 36. As shown in Fig. 1, the housing 30 is secured to the extension 34 by bolts 37 and in a position such that the chamber 31 is axially alined with the bore 36.

Fluid flow through the valve 20 is controlled by a movable valve member comprising a tubular element 40 supported and guided for endwise sliding movement into and out of the bore 36. Support is provided for the valve element by a member 41 having a central hub portion 42 formed with an opening 43 receiving the element 40 with a sliding fit. The hub portion is reduced in diameter to fit tightly into a counterbore 44 formed adjacent the open end of the bore 36. The counterbore 44 also provides space for a suitable packing ring 45 which effectively prevents leakage of fluid around the outside of the valve element 40. In the particular embodiment illustrated the packing ring 45 is confined between backing washers 46 of leather or other suitable material.

As will be seen by reference to Fig. 2 of the drawings, the body portion of the guide member 41 is shaped and dimensioned to fit snugly within the chamber 31 and to define a projecting flange portion 47 received within a counterbore 48 formed in the housing 30 adjacent the front end of the chamber 31. The shoulder formed by the counterbore 48 abuts the face of the flange 47 and thus serves to clamp the guide member securely in the counterbore 44 when the housing is bolted to the support 34.

The tubular valve element 40, above described, forms in effect an extension of the bore 36 and defines a fluid passage 50 extending from the bore to the rear end of the chamber 31. For controlling fluid flow through this passage the end wall of the chamber 31 is formed with a recess 51 defining an annular valve seat 52 against which the end of the valve element 40 may abut in sealing engagement. It will be observed that the diameter of the valve seat 52 is smaller than the external diameter of the valve element 40 and that the end of the latter is beveled as at 53 for coaction with the seat. The effective area at the inner end of the valve element subject to the pressure of the fluid in the system is therefore slightly greater than the area of the seated end and consequently the action of the pressure tends to maintain the valve element in engagement with the seat 52. This effective area is deliberately kept small so that the mechanical force, exerted through pin 63, for unseating the valve need not be great.

Provision is made for yieldably urging the valve element 40 against the valve seat 52 to close the passage 50 against fluid flow from the actuator cylinder 10. Moreover, the arrangement is such that upon movement of the valve element away from the seat the initial flow of pressure fluid into the chamber 31 is effective to impart further movement to the valve element to open the valve fully for substantially unrestricted flow into the chamber 31 and then through discharge ports 54 provided in the side wall of the chamber. These ports are spaced from the valve end of the chamber and are normally closed off by a piston element 55 mounted on the valve element 40 and having a working fit with the walls of the chamber. A retaining ring 56 seated in a groove in the valve element prevents axial displacement of the piston element 55 relative to the latter by the action of pressure fluid thereon.

For yieldably urging the valve element 40 to closed position, a coil spring 57 is interposed between the guide member 41 and the adjacent face of the piston element 55. This spring, of course, tends to shift the piston element into a position to close the ports 54 against the flow of pressure fluid from the chamber 31. As explained above, the initial admission of pressure fluid to the rear end of the cylinder shifts the piston forwardly and thus opens the ports for rapid, substantially unrestricted, exhaust of fluid from the actuator cylinder. After such exhaust, with the resultant lowering of the hitch linkage, any further fluid supplied by the pump is exhausted through the ports 54 which are maintained open by the pressure on the piston element 55. As pressure in the system drops, the valve element will tend to move to closed position, but so long as any flow obtains, the force exerted on the piston 55 will prevent complete closure of the valve. Accordingly, the fluid actuator will remain in released condition until the supply of fluid from the pump has been shut off.

As explained heretofore, imposition of an overload on the hitch linkage results in a forward movement of the push rod 25. This movement is utilized to initially open or "crack" the release valve and initiate the full opening through the action of the pressure fluid in the system. For this purpose a lever 60 is pivotally supported at one end by a pin 61 on the rear end portion of the housing 30 and has its other end in abutting engagement with the forward end of the push rod 25. In the particular embodiment illustrated the lever 60 is mounted between a pair of spaced lugs 62 formed integrally with the housing 30 and the pin 61 is inserted through suitable apertures in the lugs. Interposed between the intermediate portion of the lever 60 and the piston element 55 of the valve is a cylindrical pin 63 slidable in an opening 64 in the end wall of the housing. The pin is dimensioned to permit the plunger 55 to advance under the action of the spring 57 to the closed position in which it is shown in Fig. 2 when the push rod is in its normal retracted position. Accordingly, even a short movement of the push rod as a result of a slight overload will be effective to shift the valve plunger 55 and valve element 40 far enough to "crack" the valve and permit flow of pressure fluid from the ram cylinder into the chamber 31. Thus instant full opening of the valve is insured whenever the hitch linkage is subjected to an overload even slightly greater than that for which the system is set.

It will be apparent from the foregoing that the invention provides an overload release valve of novel and advantageous construction. The valve utilizes relatively few parts and those parts are all adapted to be made by relatively simple manufacturing processes. Installation and assembly is easily effected, as is replacement of any parts that become unserviceable for one reason or another. Moreover, the improved valve is reliable and efficient in operation and insures complete and instantaneous venting of the pressure fluid system in response to even slight displacements of the load responsive controls in the linkage actuating system.

I claim as my invention:

1. A release valve comprising, in combination, a housing defining an elongated cylindrical chamber having an inlet opening at one end, a vent intermediate its ends and an internal valve seat at the other end alined with said opening, an elongated valve element slidable in said opening into and out of engagement with said seat, said valve element having a longitudinal passage in communication with said inlet opening and closed against the flow of fluid when the member is in engagement with said seat, a piston element fixed on said valve element and having a working fit with the walls of the chamber, spring means yieldably urging said valve element into sealing engagement with said seat, means operable to shift said valve element from said seat and thereby initiate a flow of fluid from the inlet opening through said passage into said chamber ahead of said piston, said fluid acting on said piston to shift the valve element farther from said seat and to open said vent to permit substantially unrestricted flow of fluid through the valve.

2. A release valve comprising, in combination, a housing defining an elongated cylindrical chamber, a piston working in said chamber, said chamber having an inlet opening at one end communicating with a source of fluid under pressure, means defining a valve seat at the other end of said chamber, a valve element fixed to and extending through said piston and having one end slidable in said opening, the other end of said element being shaped for cooperation with said seat, said element having a longitudinal passage in communication with the inlet opening, spring means urging said element against said seat to maintain said passage closed, means operable to shift said element away from said seat against the action of said spring means and thereby initiate flow of pressure fluid from the inlet opening through said passage into the adjacent end of said chamber, the pressure fluid acting on said piston to shift the element farther away from said seat, said housing having an outlet port opened upon a predetermined movement of said piston for venting the pressure fluid source.

3. A valve comprising, in combination, a housing forming a cylindrical chamber with an axially disposed pressure fluid inlet opening at one end and a recess defining a valve seat at the other end alined with said opening, a tubular valve element having one end slidably engaged in said opening and defining a passage for fluid supplied through said opening, said element having its other end shaped for cooperation with said valve seat, a sealing ring interposed between the housing and said element adjacent said one end to prevent leakage around the element, spring means yieldably urging said element axially into engagement with said seat to close said passage against the flow of fluid into said chamber, a piston enlargement rigid with said valve element and having a working fit in said chamber, said valve element when shifted from said seat serving to admit fluid to the chamber ahead of said piston to force the element and the piston inwardly against the action of said spring means, said chamber having a lateral opening uncovered upon movement of the piston through a predetermined stroke.

4. A valve comprising, in combination with a supporting structure having a portion formed with a passage opening at one end in a bore, a housing rigidly secured to said portion of the structure and defining a cylindrical chamber axially alined with and opening into said bore, a valve element having one end slidable in said bore and extending across said chamber to engage the opposite end thereof, said valve element having a longitudinal fluid passage closed by engagement of the member with the end of the chamber, spring means yieldably urging said valve element to the closed position, a piston mounted on said valve element and having a sliding fit with the wall of the chamber, means for mechanically displacing said valve element from closed position to initiate a flow of fluid through the element into the adjacent end of the chamber, the fluid admitted to said chamber acting on said piston element to further displace said element, said chamber having a discharge port normally closed by said piston and opened for venting fluid from the chamber upon predetermined displacement of said valve element.

5. A valve comprising, in combination with a support presenting a flat surface with a fluid passage opening therein through a cylindrical bore, a housing defining a cylindrical chamber open at one end and having a laterally opening discharge port, said housing having a flat surface at its open end, means for removably securing said housing to said support with said flat surfaces abutting and with said bore coaxially alined with said chamber, a tubular valve element supported for sliding movement within said bore, said housing having a recess in its end wall defining a valve seat engageable by the end of said element to close the same against the flow of fluid therethrough, means yieldably urging said valve element against said seat, means for displacing said valve element from said seat to admit fluid flow through the element into said chamber, and means actuated by the fluid introduced into the chamber for further displacing said valve element and for establishing communication between the valve element and said discharge port.

6. A valve comprising, in combination with a support presenting a flat surface with a fluid passage opening therein through a cylindrical bore, a housing defining a cylindrical chamber open at one end and having a laterally opening discharge port, said housing having a flat surface at its open end, means for removably securing said housing to said support with said flat surfaces abutting and with said bore coaxially alined with said chamber, an elongated valve element, an annular member accurately fitted into said chamber adjacent the open end of said housing and having a central opening supporting and guiding said valve element for endwise sliding movement axially of said chamber, said member having a coaxial hub portion engageable in said bore to aline the chamber therewith.

7. A valve comprising, in combination with a support presenting a flat surface with a fluid passage opening therein through a cylindrical bore, a housing defining a cylindrical chamber open at one end and having a laterally opening discharge port, said housing having a flat surface at its open end, means for removably securing said housing to said support with said flat surfaces abutting and with said bore coaxially alined with said chamber, an elongated valve element, an annular member snugly fitted into said chamber adjacent the open end of said housing and having an opening supporting and guiding said valve element for endwise sliding movement axially of said chamber, said member having a coaxially alined hub portion dimensioned to fit snugly within said bore, and said housing having means coacting with the member to press the hub portion into the bore when the housing is secured to the support.

8. A valve comprising, in combination with a support presenting a flat surface with a fluid passage opening therein through a cylindrical bore, a housing defining a cylindrical chamber open at one end and having a laterally opening discharge port, said housing having a flat surface at its open end, means for removably securing said housing to said support with said flat surfaces abutting and with said bore coaxially alined with said chamber, an elongated tubular valve element substantially smaller than said bore and having one end projecting into the bore, a member having a hub portion dimensioned to fit within said bore and a central aperture for supporting and guiding said valve element for endwise sliding movement axially of said chamber, said housing having a counterbore defining a shoulder facing the open end of the chamber, a circumferential flange on said member received in said counterbore and engaged by said shoulder to press the hub portion of the member into said bore when the housing is secured to the support, a piston mounted on said valve element and in sliding engagement with the wall of the chamber, and spring means interposed between said member and said piston urging the member toward the closed end of the chamber, said closed end of the chamber having a recess defining a valve seat engageable by said valve element to close the same against the flow of pressure fluid.

9. A valve comprising, in combination, a housing forming a cylindrical chamber with an axially disposed pressure fluid inlet opening at one end and a circular recess defining an annular valve seat at the other end alined with said opening, a cylindrical valve element having one end projecting into said opening and slidable endwise therein, said element having a longitudinal bore forming a fluid passage closed by engagement of the other end of the element with said valve seat, said valve seat having a smaller diameter than said element so as to expose to the action of pressure fluid in the cylinder an effective area slightly smaller than the effective exposed area of the element in said opening whereby the element is maintained against the seat with a predetermined pressure, a piston enlargement rigid with said valve element and having a working fit in said chamber, and means for displacing said valve element from said seat against the pressure exerted thereon to admit fluid into said chamber, said fluid acting on said piston element to further displace the valve element, said chamber having a vent opening uncovered by said piston upon such further displacement of the valve element.

References Cited in the file of this patent

UNITED STATES PATENTS

| Number | Name | Date |
|---|---|---|
| 787,136 | Warren | Apr. 11, 1905 |
| 1,147,820 | Scott | July 27, 1915 |
| 2,459,664 | Majneri | Jan. 18, 1949 |
| 2,524,552 | Wales et al. | Oct. 3, 1950 |
| 2,529,431 | Steins | Nov. 7, 1950 |
| 2,532,578 | Spencer | Dec. 5, 1950 |
| 2,537,051 | Grant | Jan. 9, 1951 |

FOREIGN PATENTS

| 969,077 | France | May 17, 1950 |